Patented July 13, 1948

2,445,189

UNITED STATES PATENT OFFICE 2,445,189

POLYMERIZATION OF UNSATURATED COMPOUNDS IN THE PRESENCE OF A PEROXIDE AND A HYDROGEN HALIDE

Edward C. Shokal, Oakland, Calif., assignor to Shell Development Company, San Francisco, Calif., a corporation of Delaware No Drawing. Application March 21, 1944, Serial No. 527,490

6 Claims. (Cl. 260—78.4)

This invention relates to the polymerization of unsaturated compounds in the presence of oxygen-containing catalysts.

Peroxides and other oxygen-yielding substances are common and effective catalysts for the polymerization of unsaturated organic compounds. In many cases, however, peroxides give rise to color-formation, i. e. discoloration, during polymerization, the intensity of the produced color being directly related to the amount of catalyst present. Discoloration is generally objectionable.

An object of the present invention is to provide for reducing color-formation in the polymerization of unsaturated compounds in the presence of oxygen-containing catalysts. Another object is to provide new polymerizable compositions. Another object is to provide an improved method of polymerizing unsaturated resin-forming compounds. Another object is to provide peroxide-catalyzed polymers of improved quality. Another object is to provide new synthetic resins. Other objects will be apparent from the description of the invention given hereinafter.

These objects are accomplished in accordance with the present invention by the polymerization of polymerizable unsaturated compounds which discolor when subjected to polymerization with an oxygen-yielding catalyst, in the presence of a small amount of a hydrogen halide. It has now been found that hydrogen halides are capable of reducing the discoloration developed in the production of resins by polymerization reactions catalyzed by peroxides and the like. When the amount of halide present is small relative to the amount of resin, the hardness and other physical properties of the resin are not significantly adversely affected.

Compounds which can be polymerized in the presence of hydrogen halides in accordance with the invention consist of the unsaturated esters of polycarboxylic acids, which acids are devoid of any unsaturated linkage between any two carbon atoms of aliphatic character, and wherein the hydrogen atom of at least one of the carboxyl groups is replaced by an unsaturated hydrocarbon radical.

A preferred subgroup, which consists of those compounds with which the importance of the invention is most apparent, comprises esters of polycarboxylic acids with unsaturated alcohols of aliphatic character.

Suitable unsaturated alcohols whose ester radicals may constitute a part of the compounds with which the invention is particularly concerned are those having an unsaturated linkage of aliphatic character between two carbon atoms, one of which is directly attached to a carbon atom to which is directly attached an alcoholic hydroxyl group. These compounds can be described also as alcohols of aliphatic character having an unsaturated linkage between two carbon atoms, at least one of which is not more than once removed from the alcoholic hydroxyl group.

One subgroup of unsaturated alcohols within the foregoing definition consists of allyl-type alcohols. Allyl-type alcohols are unsaturated compounds having an olefinic double bond of aliphatic character between two carbon atoms, one of which is directly joined to a saturated carbinol carbon atom. They have a structure which may be represented by the general structural formula

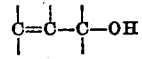

Preferred allyl-type alcohols have a terminal methylene group attached by an olefinic double bond to a carbon atom which is directly attached to a saturated carbinol carbon atom, as represented by the formula

Allyl-type alcohols useful in the present invention preferably have not more than about eighteen carbon atoms and have at least one unsaturated carbon-to-carbon linkage for each six carbon atoms.

Representative examples of preferred allyl-type alcohols are the following: allyl alcohol, methallyl alcohol, ethallyl alcohol, chloroallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, 3,7-dimethyl-octadien-2,7-ol-1, cyclopenten-2-ol-1, cyclohexen-2-ol-1, etc.

Another subgroup of suitable unsaturated alcohols consists of alpha-unsaturated aliphatic alcohols, e. g. vinyl-type alcohols, which are compounds having a double bond of aliphatic character between two carbon atoms, one of which is directly attached to an alcoholic hydroxyl group, as represented by the general formula

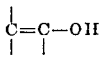

Of the vinyl-type alcohols a preferred subgroup consists of compounds having a terminal methylene group attached by an olefinic double bond to a carbinol carbon atom, as represented by the general formula $$CH_2=C-OH$$

Examples of preferred vinyl-type alcohols are vinyl alcohol, iso-propenol, buten-1-ol-2, etc. Examples of other vinyl-type alcohols are propen-1-ol-1, buten-1-ol-1, cyclohexen-1-ol-1, cyclopenten-1-ol-1, etc. Vinyl alcohol is the preferred specific alpha-unsaturated alcohol.

Other unsaturated alcohols whose radicals may constitute part of the compounds with which the invention is concerned are those having a triple bond of aliphatic character between two carbon atoms, one of which is directly attached to a saturated carbon atom, which in turn is directly attached to an alcoholic hydroxyl group as represented by the general formula

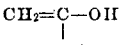

as exemplified by propargyl alcohol, pentyn-3-ol-2, 2-methyl-hexyn-3-ol-2, etc.

Polycarboxylic acids whose radicals may form part of the preferred esters in accordance with the invention include saturated acyclic aliphatic acids such as oxalic, malonic, glutaric, adipic, pimelic, suberic, azelaic, sebacic, tartaric, citric, tricarballylic, etc. Another group consists of alicarbocyclic and heterocyclic polycarboxylic acids, e. g. cyclohexane-1,2-dicarboxylic, tetrahydrophthalic, pentane-1,2-dicarboxylic, etc., acids. Another group consists of ethereal oxygen-containing polycarboxylic acids such as diglycolic, dilactic, dihydracrylic, etc., and compounds best represented by the following formulas:

$$HOOC-CH(CH_3)-O-CH_2-COOH$$
$$HOOC-CH_2-CH_2-O-CH_2-COOH$$
$$HOOC-CH(CH_3)-CH_2-O-CH_2-COOH$$
$$HOOC-CH(CH_3)-O-CH_2-CH_2-COOH$$
$$HOOC-CH(CH_3)-CH_2-O-CH_2-CH_2-COOH$$

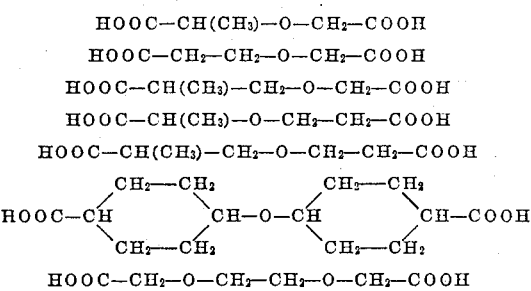

$$HOOC-CH_2-O-CH_2-CH_2-O-CH_2-COOH$$

Another group consists of sulfonyl-containing polycarboxylic acids, e. g. sulfonyl diglycolic, sulfonyl dihydracrylic, sulfonyl dilactic, etc., acids. Another and preferred group consists of aromatic polycarboxylic acids, i. e. acids having two or more carboxyl groups directly attached to an aromatic ring. Among the many suitable aromatic polycarboxylic acids are phthalic, isophthalic, terephthalic, naphthalene dicarboxylic, dimethyl phthalic, dichlorophthalic, etc., acids and the corresponding higher polycarboxylic acids. Among the many other suitable acids are tetrachlorophthalic acid and the other polyhalobenzene polycarboxylic acids.

Simple or mixed esters may be used.

Examples of suitable polymerizable unsaturated aromatic polycarboxylic acid esters are diallyl phthalate, dimethallyl phthalate, dichloroallyl phthalate, diethallyl phthalate, diallyl isophthalate, dimethallyl isophthalate, allyl chloroallyl phthalate, allyl crotyl phthalate, diallyl tetrachlorophthalate, dimethallyl tetrachlorophthalate, divinyl phthalate, di-isopropenyl phthalate, allyl vinyl phthalate, methallyl vinyl phthalate, chloroallyl vinyl phthalate, allyl isopropenyl phthalate, methallyl isopropenyl phthalate, allyl(butene-1-yl-2) phthalate, crotyl vinyl phthalate, crotyl propargyl phthalate, allyl propargyl phthalate and the corresponding esters of the higher polycarboxylic aromatic acids. The compound specifically preferred by reason of its stability under polymerization conditions, the ease and comparative cheapness of its preparation, its ready polymerizability and the high quality and reproducibility of products containing the polymer is diallyl phthalate.

Examples of suitable unsaturated esters of saturated aliphatic polycarboxylic acids are diallyl oxalate, divinyl oxalate, diallyl malonate, diallyl adipate, allyl vinyl adipate, diallyl citrate, etc. Examples of suitable unsaturated esters of ethereal oxygen-containing polycarboxylic acids are diallyl diglycolate, diallyl dihydracrylate, diallyl dilactate, dimethallyl diglycolate, allyl vinyl diglycolate, etc. Examples of suitable esters of sulfonyl-containing carboxylic acids are diallyl sulfonyl diglycolate (also known as diallyl dimethylsulfone alpha,alpha'-dicarboxylate), diallyl sulfonyl dihydracrylate (also known as diallyl diethylsulfone beta,beta'-dicarboxylate), etc.

In the case of esters of unsaturated alcohols with polycarboxylic acids of the class defined herein but a single carboxyl group of the acid may be esterified with an unsaturated alcohol, the remaining carboxyl group or groups being unesterified or esterified with a saturated alcohol; or the carboxyl groups of the acid may be esterified with two or more different unsaturated alcohols.

Polymerization is effected in accordance with the invention in the presence of an oxygen-yielding catalyst, particularly one which normally gives rise to color-formation during or after polymerization. The most notable example is benzoyl peroxide. Others are tertiary alkyl hydroperoxides, such as tertiary butyl hydroperoxide (often called simply tertiary butyl peroxide), and di(tertiary alkyl) peroxides, such as di(tertiary butyl) peroxide. Other organic peroxides result in color-formation, as do many other oxygen-yielding compounds, e. g. perborates, persulfates, etc. The catalysts can be used alone, or in admixture with one another, or with other polymerization catalysts. In some cases polymerization is desirably effected in the presence of both a catalyst and an inhibitor of polymerization.

The optimum amount of catalyst employed in the polymerization is dependent upon many factors and no general limits can be given. In general, it is preferred to employ as little catalyst as is required to bring about the reaction in a commercially feasible period of time under practical operating conditions. Amounts of catalysts as small as 0.01% by weight of the polymerizable material can be used. On the other hand, amounts as great as 10% or more may be employed. More usually the range is from about 1% to about 5% of benzoyl peroxide catalyst or its equivalent by weight of polymerizable material. In general, the greater the quantity of catalyst present the greater is the discoloration under given conditions and the more advantageous is the use of the compositions and technique of the invention.

Any of the hydrogen halides may be present during polymerization in accordance with the invention. Hydrogen bromide is particularly effective. Hydrogen iodide, hydrogen chloride and hydrogen fluoride may be used.

It is not essential that the hydrogen halide be added as such to the polymerization mixture. It may, for instance, be formed in situ by the reaction of one or more suitable reactive substances. The halide modifier may be added to substantially unpolymerized monomer, or to partially polymerized material.

The amount of hydrogen halide employed should not be great since it has been found that the hardness and other physical properties of the material may be deleteriously affected thereby. In general it is preferred to use no more than one part of hydrogen halide per 100 parts of polymerizable material, and in most cases 0.5 part is sufficient. 0.5 part of hydrogen halide per 100 parts of the polymerizable material effects a very substantial reduction in color-formation without significantly reducing the hardness of the resinous polymer. Smaller amounts, e. g. 0.1% or even less, are often sufficient. In those cases, however, where the achievement of maximum hardness is not as important as color reduction, amounts larger than 1%, e. g. 2% to 5%, or even somewhat more, may be used.

Polymerization reactions in accordance with the invention can be carried out in a continuous or batchwise manner, at atmospheric, superatmospheric or reduced pressures. The invention is particularly important in the production of cast shapes by the polymerization of resin-forming polymerizable compounds in a mold in the substantial absence of solvent or non-solvent diluent.

Polymerization is generally carried out under the influence of heat, the temperature used being dependent upon many factors. In general, temperatures of from about room temperature to about 300° C. have been used. The polymerization of diallyl phthalate in accordance with the invention is preferably effected at between about 60° C. and about 250° C., employing in the lower range, e. g. 60° C. to 130° C., a catalyst such as benzoyl peroxide which is effective and relatively stable in that range and in the higher range, e. g. 130° C. to 250° C., a catalyst such as tertiary butyl hydroperoxide or a di(tertiary alkyl) peroxide. It is sometimes desirable to polymerize in two or more different steps, using different temperatures and/or different catalysts.

The polymerization reaction can be carried to completion without substantial interruption, or it can be stopped at any point short of completion. In the case of resin-forming compounds incomplete polymerization can be used for the production of a syrup comprising a mixture of monomer and polymer which can be further worked and eventually substantially completely polymerized. The syrup may, for instance, be transferred to a mold of any desired configuration and again subjected to polymerization conditions or it may be used in coating operations or in the impregnation of bibulous, e. g. porous, material which, in turn, may be used in the production of laminates. Unreacted monomer may be separated from its mixture with polymer by solvent extraction, distillation or other methods. The polymer may then be worked up in any known or special manner. In the case of many compounds, particularly in the case of compounds having two or more non-conjugated polymerizable unsaturated linkages in the molecule, the separated polymer may be capable of further polymerization. Such compounds can be rendered infusible and insoluble in common non-reacting solvents.

Polymers, partial polymers and mixtures thereof with monomer can be subjected to many kinds of after treatment. They may be halogenated, hydrogenated, treated with sulfur dioxide, heated with sulfur, etc.

Polymers produced in accordance with the invention contain a small amount of hydrogen halide which tends to stabilize the polymer against discoloration.

The following examples are given for the purpose of illustrating the invention. Parts are on a weight basis.

Example I

In each case, except for the blank, a sufficient amount of hydrogen bromide was dissolved in a mixture of diallyl phthalate, 100 parts, and benzoyl peroxide, 2 parts, to give a solution having the indicated concentration of bromine, based on the weight of diallyl phthalate present. Each solution was placed in a glass vessel, which was then sealed and held at 65° C. for 144 hours, following which the hardness and color of the resulting resin were determined. The blank consisted of a mixture of diallyl phthalate, 100 parts, and benzoyl peroxide, 2 parts.

| Percent Br | Properties of Resin | |
|---|---|---|
| | Color No. | Hardness |
| None | 8 | 35 |
| 0.28 | 3+ | 33 |
| 0.55 | 2 | 28 |

The same procedure and proportions are used in the polymerization of methyl methacrylate.

Example II

A mixture of diallyl diglycollate, 100 parts, and benzoyl peroxide, 2 parts, is admixed with sufficient hydrogen bromide to give a solution containing 0.5 part of bromine per 100 parts of diallyl diglycolate. The solution is heated at 65° C. for 144 hours in a sealed glass mold. The resulting resin is lighter in color than a resin produced under identical conditions from otherwise identical materials with the addition of a hydrogen halide.

Example III

Resins are produced in accordance with Example I, except that hydrogen iodide is used instead of hydrogen bromide. In each case the products are lighter in color and slightly less hard than the blank, which contained no hydrogen halide.

Example IV

A mixture of diallyl phthalate, 90 parts, diallyl diglycolate, 10 parts, and benzoyl peroxide, 2 parts, is admixed with sufficient hydrogen bromide to give a solution containing 0.5 part of bromine per 100 parts of the combined weight of diallyl phthalate and diallyl diglycolate. The solution is polymerized in accordance with the procedure outlined in Example I.

I claim as my invention:

1. In a process wherein a resin is formed by the polymerization of diallyl phthalate in the presence of an organic peroxide catalyst and in the absence of solvents and non-solvent diluents for the diallyl phthalate, the improvement which comprises avoiding discoloration of the resin by effecting said polymerization in the presence of from 0.01% to 1% of hydrogen bromide.

2. In a process wherein a resin is formed by the polymerization of diallyl phthalate in the presence of an organic peroxide catalyst and in the absence of solvents and non-solvent diluents for the diallyl phthalate, the improvement which comprises avoiding discoloration of the resin by effecting said polymerization in the presence of from 0.01% to 1% of a hydrogen halide.

3. In a process wherein a resin is formed by the polymerization of an aromatic polycarboxylic acid ester of a beta,gamma-monoolefinic monohydric alcohol having the carboxyl carbon atoms directly attached to an aromatic ring, which polymerization is effected in the presence of a peroxide catalyst and in the absence of solvents and non-solvent diluents for said ester, the improvement which comprises avoiding discoloration by conducting said polymerization in the presence of from 0.01% to 5% of a hydrogen halide.

4. In a process wherein a resin is formed by the polymerization of an aromatic polycarboxylic acid ester of an unsaturated alcohol wherein the unsaturation is olefinic and the carboxyl carbon atoms are directly attached to an aromatic ring, which polymerization is effected in the presence of a peroxide catalyst and in the absence of solvents and non-solvent diluents for said ester, the improvement which comprises avoiding the discoloration by conducting said polymerization in the presence of from 0.01% to 5% of a hydrogen halide.

5. In a process wherein a resin is formed by the polymerization of diallyl diglycolate in the presence of an organic peroxide catalyst and in the absence of solvents and non-solvent diluents for the diallyl diglycolate, the improvement which comprises avoiding discoloration of the resin by effecting said polymerization in the presence of from 0.01% to 1% of hydrogen bromide.

6. In a process wherein a resin is formed by the polymerization of an unsaturated ester of a polycarboxylic acid, which acid is devoid of any unsaturated linkage between any two carbon atoms of aliphatic character, and wherein the hydrogen atom of at least one of the carboxyl groups of the acid is replaced by an unsaturated aliphatic hydrocarbon radical wherein the unsaturation is olefinic, which polymerization is effected in the presence of an organic peroxide catalyst and in the absence of solvents and non-solvent diluents for said ester, the improvement which comprises avoiding discoloration by conducting said polymerization in the presence of from 0.01% to 5% of a hydrogen halide.

EDWARD C. SHOKAL.

REFERENCES CITED

The following references are of record in the file of this patent:

UNITED STATES PATENTS

| Number | Name | Date |
|---|---|---|
| 2,146,735 | Hale | Feb. 14, 1939 |
| 2,194,205 | Kenyon et al. | Mar. 19, 1940 |
| 2,222,967 | Wollthan et al. | Nov. 26, 1940 |
| 2,231,905 | Hanford et al. | Feb. 18, 1941 |
| 2,307,157 | Quattlebaum et al. | Jan. 5, 1943 |
| 2,310,731 | D'Alelio | Feb. 9, 1943 |
| 2,332,900 | D'Alelio | Oct. 26, 1943 |